Figure 1:
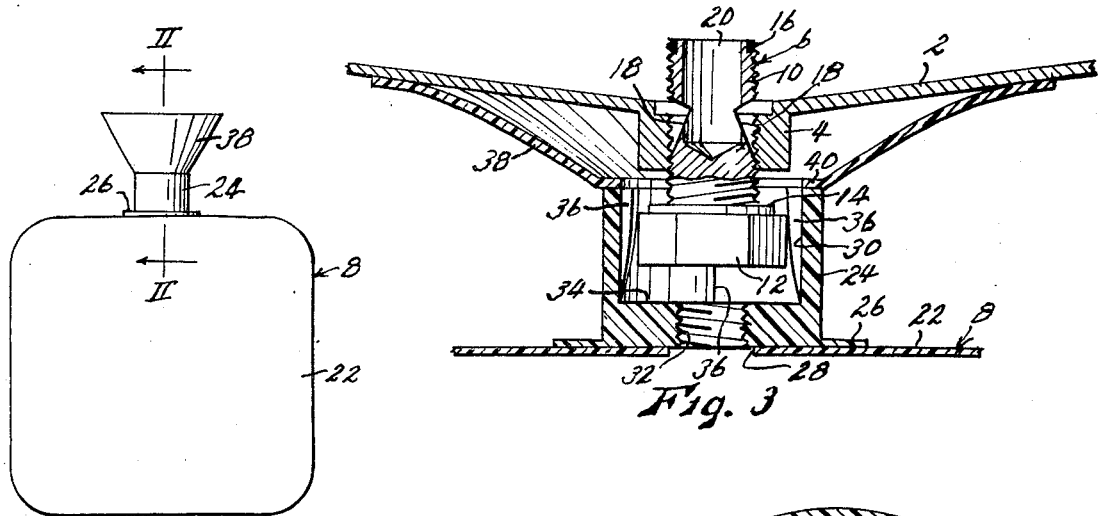

United States Patent [19]
Guenther

[11] 3,967,697
[45] July 6, 1976

[54] CRANKCASE OIL DRAINAGE AND COLLECTION DEVICE

[76] Inventor: Manfred H. Guenther, Rte. No. 2, Box 290 T, Belton, Mo. 64012

[22] Filed: Sept. 23, 1974

[21] Appl. No.: 508,512

[52] U.S. Cl. .............................................. 184/1.5
[51] Int. Cl.² ........................................ F16N 33/00
[58] Field of Search ........... 141/281, 311, 313, 314, 141/346, 347, 351, 364, 369, 379–381, 383–386; 184/1.5

[56] References Cited
UNITED STATES PATENTS

| | | | |
|---|---|---|---|
| 1,668,245 | 5/1928 | McGowan | 184/1.5 |
| 1,729,978 | 10/1929 | Barron | 184/1.5 X |
| 3,103,947 | 9/1963 | Mueller | 184/1.5 X |

OTHER PUBLICATIONS
Popular Mechanics, June 1974, p. 128.

Primary Examiner—Richard E. Aegerter
Assistant Examiner—Frederick R. Schmidt
Attorney, Agent, or Firm—John A. Hamilton

[57] ABSTRACT

A crankcase oil drainage and collection device consisting of a threaded drainage plug especially designed to present an enlarged head at its outer end normally having sealing contact with the crankcase, but not to initiate any appreciable drainage of oil until the enlarged head has been retracted to a substantial distance from the crankcase, and a container for oil having a special neck engageable over the plug head when said plug is partially retracted, the neck having a funnel extension engageable with the crankcase to direct oil from the crankcase to the container, the plug being operable to effectively open the crankcase drain opening when it is screwed still further from the crankcase, but before it is disengaged from the crankcase.

3 Claims, 6 Drawing Figures

U.S. Patent  July 6, 1976  3,967,697

CRANKCASE OIL DRAINAGE AND COLLECTION DEVICE

This invention relates to new and useful improvements in crankcase drainage and oil collection apparatus, and has as its principal object the provision of means whereby the owners of motor vehicles, especially automobiles, may conveniently drain and save used oil from the crankcases of their vehicles.

It has been estimated that about 40% of all motor oil sold in the United States is purchased at retail by motor vehicle owners who change their own oil at home. For the most part, they simply dump the used oil into sewers, onto the ground, or the like, where it can have seriously detrimental effects on the environment, such as water pollution, the fouling of sewers, and the death of marine life. Most of such oil could be re-refined for further use, and if it were so recovered and re-refined it could represent a substantial step in the alleviation of present petroleum shortages. It is estimated that as much as 730 million gallons of oil are "wasted" in this manner during a single year. Therefore, the potential worth of a device enabling the automobile owner easily and conveniently to drain and save the used oil from his vehicle crankcase, both in the improvement of the environment and in the conservation of resources, is readily evident. But such drainage and collection is a messy, dirty, tedious and time-consuming operation with presently available equipment. The individual car owner ordinarily does not have a power lift for raising his vehicle to gain easy access to the crankcase drain plug. When the drain plug is removed, the oil commonly splashes or splatters on everything nearby, including the car owner himself. Since the stream of draining oil constantly changes direction as the amount of oil in the crankcase diminishes, the oil ordinarily must be collected in a pan or other container having a very wide mouth, and must later be poured therefrom into a sealable container if it is to be turned in for re-refining.

The present invention provides a drainage and collection device which overcomes all of the above enumerated problems, in that it does not require full and easy access to the drain plug, prevents splashing or splattering of the oil as it is drained, and provides for direct transfer of the oil from the crankcase to a resealable container in which it may conveniently be stored and transported for return to a dealer or other collection point for re-refining. The device generally includes a special drain plug for the crankcase which may be substituted for the original drain plug, and a special oil-receiving container. The plug is threaded and has an enlarged head which normally engages the crankcase with a totally sealing contact, the plug as it is threaded outwardly moving first to an intermediate position wherein the head is spaced apart from the crankcase but still no appreciable drainage of oil occurs, and then to a fully extended position wherein it is still engaged in the crankcase, but wherein internal passages thereof permit free drainage of oil. The container includes a neck having internal members which may be snapped over the plug head when the plug is in said intermediate position, whereby to support the container, and which thereafter serves as a means for turning the plug to its fully extended position, and a funnel member operable to engage the crankcase around its drain opening when the plug is in its intermediate and extended positions, whereby to direct oil draining from the crankcase to and into said neck.

Other objects are simplicity and economy of construction, efficiency and dependability of operation, and ease and convenience of use.

Figure 2:
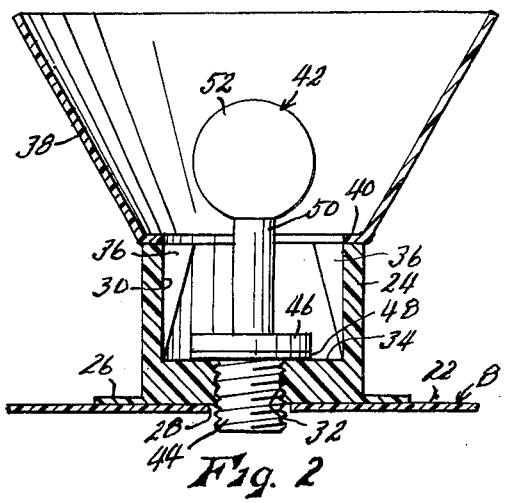
Figure 5:
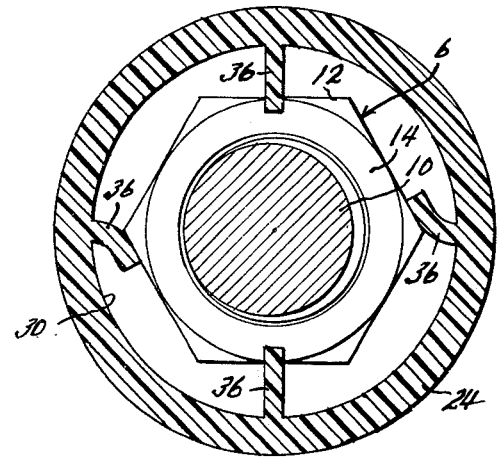
Figure 4:
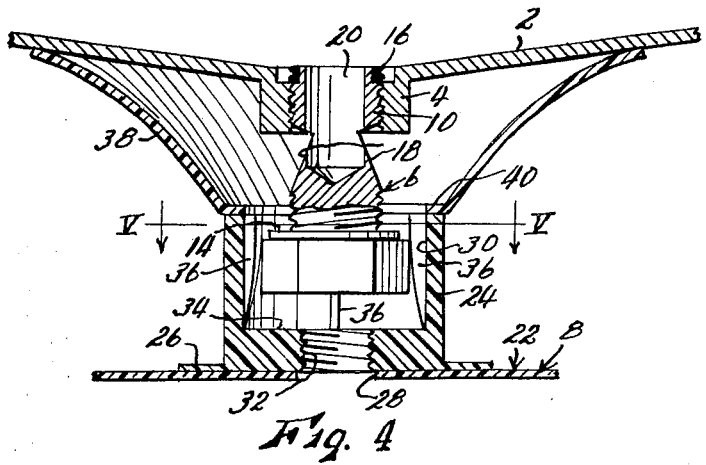
Figure 6:
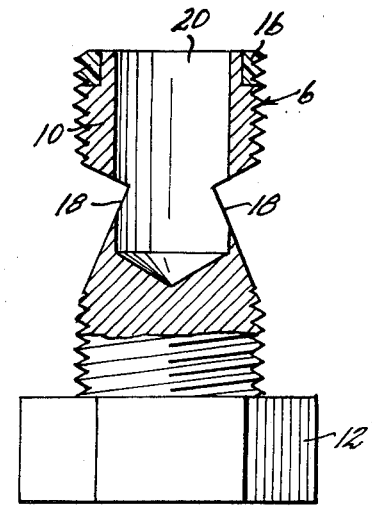

With these objects in view, as well as other objects which will appear in the course of the specification, reference will be had to the accompanying drawing, wherein:

FIG. 1 is a side elevational view of a crankcase oil drainage and collection device embodying the present invention, FIG. 2 is an enlarged, fragmentary sectional view taken on line II—II of FIG. 1, FIG. 3 is a view similar to FIG. 2, but including the special crankcase drain plug, with the entire device shown applied to a crankcase drain at an intermediate stage of the use of the device, FIG. 4 is a view similar to FIG. 3, showing the parts in the position assumed during full drainage of the crankcase, FIG. 5 is an enlarged sectional view taken on line V—V of FIG. 4, and FIG. 6 is an enlarged side view of the special drain plug, partially broken away and shown in section.

Like reference numerals apply to similar parts throughout the several views, and the numeral 2 applies to the bottom wall of the crankcase of an automotive vehicle, said wall being provided with an internally threaded neck 4 through which oil may drain when the usual threaded drain plug, not shown, is removed therefrom. The crankcase floor normally slopes downwardly toward neck 4, in order that drainage may be as complete as possible. The drainage and collection device forming the subject matter of the present invention includes a special drain plug indicated generally by the numeral 6, and a special oil container indicated generally by the numeral 8.

Special drain plug 6 has the form of a bolt, having an externally threaded shank 10 which may be threaded into crankcase neck 4, and an enlarged hexagonal head 12. These plugs may be supplied with various shank diameters and thread pitches, so as to fit all standard crankcase drainage necks. A gasket 14 surrounds shank 10 against head 12, to form a tight seal against the lower face of neck 4 when the plug is threaded all the way into neck 4 and tightened to compress the gasket. For a purpose which will presently appear, a portion of the shank threads at the extreme free end of the shank are formed by an insert 16. This insert is formed of a somewhat soft, compressible material such as plastic, and its threads are very slightly oversize as compared to the threads of the remainder of the shank. Thus the plug may be threaded into place, but only by the application of substantial torque thereto, as occasioned by the necessity of compressing the insert, until said insert clears the upper end of the neck, whereupon the plug will turn easily. A pair of notches 18 are formed in diametrically opposite sides of shank 10, in spaced apart relation from plug head 12. These notches open into a bore 20 formed axially in said shank from the free end thereof. Thus oil can flow from crankcase 2 through bore 20 and notches 18 through the lower end of neck 4, whenever the plug is threaded outwardly in said neck to such an extent that notches 18 extend below the lower end of said neck.

Oil container 8 includes a hollow body portion 22 which may be of any suitable construction, but which conveniently may constitute a bag formed of plastic film or the like. This bag is equipped with a filling neck 24 of generally cylindrical form, being formed at one end with an external flange 26 which may be sealed or cemented to the wall of bag 22 so that said neck communicates with a hole 28 formed in said wall. Said neck is generally tubular, the upper portion 30 of its internal bore being of sufficiently large diameter as to be engageable loosely over plug head 12, and the lower portion 32 of said bore being reduced in diameter and internally threaded, there being an upwardly facing shoulder 34 at the juncture of the larger and smaller diameters. The neck is preferably formed of a semirigid, flexible plastic material, and formed integrally therewith, interiorly of portion 30 of the bore thereof, are a plurality of inwardly projecting, generally planar flexible tabs 36. These tabs (four as shown) are spaced regularly around the periphery of upper bore portion 30, and are taperingly reduced in inward extension toward shoulder 34. At the upper or free end of the neck, their inner ends define a circle having a diameter less than the minimum diameter of hexagonal plug head 12, and they taper to a zero extension at shoulder 34.

A conically shaped funnel member 38, formed of a resiliently flexible material such as certain types of plastic, has its smaller end affixed to neck 24 in encircling relation thereto in any suitable manner, such as by means of a flange 40 at its smaller end which may be cemented or sealed around the free end of the neck. The neck is provided with a removable sealing cap 42 (see FIG. 2) which may include a lower threaded portion 44 adapted to be engaged in threaded portion 32 of the neck bore, an external flange 46 adapted to compress a sealing washer 48 against shoulder 34 of the neck, an upwardly extending axial stem 50, and a finger tab 52 at the upper end of said stem and disposed within funnel 38 where it is easily accessible.

In the use of the device, assuming that the original drain plug of the crankcase has been replaced with drain plug 6 as shown herein, the operator first loosens the plug to relieve the seal of gasket 14, and threads it outwardly to about the position shown in FIG. 3. This may usually be done simply and easily by reaching under the car with a suitable wrench, with no necessity of elevating the car on a power lift. In this position, head 12 of the plug is spaced apart from the lower end of crankcase drain neck 4, but notches 18 of the plug are still disposed within neck 4, not extending below the lower end thereof, so that even if the threads are loose, no appreciable drain flow of oil can occur. The operator can gauge this position very simply by turning the plug outwardly until some slight flow of oil does occur, and then turning the plug to advance it upwardly till the flow ceases. The operator then takes neck 24 of container 8 in one hand, with cap 42 of course removed, and pushes said neck upwardly to engage portion 30 of the neck bore over the head 12 of the plug, also as shown in FIG. 3. During this engaging movement, internal tabs 36 of the neck are resiliently deflected to admit the plug head, but as soon as said tabs project above the top surface of the plug head, at least some of said tabs will snap resiliently into place above said head, as indicated in FIGS. 4 and 5, whereby the container is secured releasably in place as shown, and its weight supported. As the container neck is pushed upwardly to engage the plug head, it will be seen also that funnel member 38 is flared resiliently outwardly against the bottom surface of crankcase 2, as shown in FIG. 2, engaging said crankcase with full peripheral contact.

Then, by grasping container neck 24 externally, the operator further turns plug 6 to advance it downwardly, or outwardly of crankcase neck 4, until notches 18 of the plug extend below the lower end of neck 4, whereupon oil flows freely from the crankcase to container body 22. Tabs 36 of the container neck will ordinarily provide sufficient resistance to relative rotation of the plug head and neck to permit rotation of the plug by grasping only the container neck, since the plug has already been loosened, but if necessary the container neck may be manually squeezed and deformed to press tightly against the plug head to turn it with greater force, the material of the container neck being sufficiently flexible for this purpose. The plastic insert 16 at the free end of the plug threads greatly resists entry thereof into the threads of the crankcase drain neck, and hence provides an easily recognizable signal to the operator that the plug has been retracted outwardly as far as necessary, thus avoiding the possibility that the plug might be turned completely free of neck 4. During the final outward movement of the plug, funnel 38 recovers elastically to maintain its contact with crankcase 2, and it of course serves a conduit leading oil emerging from plug notches 18 to the container neck. The rotation of the funnel with the plug during this movement also assists the funnel to accomodate to any irregularities of the crankcase surface, so that it will maintain a more efficient seal against splashing or splattering of the oil. The resilient grip of container neck tabs 36 on the plug head may easily be sufficiently great to support the weight of the container even when it contains four or five quarts of oil, the amount usually drained from a crankcase at one time.

However, if greater security against accidental disengagement of the container neck from the plug is desired, or especially if the container is of a size to serve as a storage container for larger amounts of oil, the container may be of such size and dimensions as to rest on the ground beneath the crankcase as oil is drained thereto. When the crankcase is completely drained, the operator simply pulls downwardly on container neck 24 to snap it out of engagement with the plug head, tightens the plug to compress gasket 14 against neck 4, and inserts cap 42 in the container neck as shown in FIG. 2.

While I have shown and described a specific embodiment of my invention, it will be readily apparent that many minor changes of structure and operation could be made without departing from the spirit of the invention.

What I claim as new and desire to protect by Letters Patent is:

1. A device for use in draining and collecting oil from the crankcase of an automotive engine, the crankcase having a bottom drain opening constituting a tubular, internally threaded neck, said device comprising:
  a. a drain plug having an externally threaded shank engageable in said crankcase neck, said plug being provided at its outer end with an enlarged head, and having an internal passage opening through the inner end portion of said shank, and laterally through the threaded surface of said shank in spaced relation from said head and from the inner end of said shank, whereby oil may drain through said passage when said plug is threaded outwardly sufficiently to position the lateral opening of said passage outwardly beyond the outer end of said crankcase neck, but with said plug still engaged in said neck, said plug having an intermediate position wherein said head, but not the lateral opening of said passage, is spaced outwardly from said neck, b. a sealing gasket encircling said plug shank and operable to be compressed between said enlarged head and the outer end of said crankcase neck, c. an oil container having a tubular neck positionable over said drain plug to receive oil drained from said crankcase through said plug, and d. means for connecting said container neck to said drain plug, when said drain plug is in said intermediate position, said connecting means comprising flexible tabs carried internally in said container neck, said tabs being resiliently deflectable to admit said enlarged plug head into said container neck, but elastically recoverable to overlie the surface of said head facing said container neck, whereby to support said container from said plug, whereby when said plug is further advanced outwardly to a fully extended position, but still engaged in said crankcase neck, the transverse opening thereof is advanced outwardly beyond the outer end of said crankcase neck.

2. A device as recited in claim 1 wherein said container neck is generally tubular and is formed of flexible material, whereby if necessary it may be manually compressed into tight engagement with said enlarged head, as an aid in turning said plug from its intermediate position to its fully extended position.

3. A device as recited in claim 1 wherein the threaded shank of said plug is provided at its upper end with a compressible threaded insert of slightly greater diameter than the remainder of said shank, said insert being engageable in said crankcase neck threads, whereby to yieldably resist movement of said insert through said crankcase neck, when said plug has been advanced outwardly to its fully extended position.

* * * * *